US008264213B2

(12) United States Patent
Lin et al.

(10) Patent No.: US 8,264,213 B2
(45) Date of Patent: Sep. 11, 2012

(54) VARIABLE-FREQUENCY AND MULTI-PHASE VOLTAGE REGULATOR MODULE AND CONTROL METHOD OF THE SAME

(75) Inventors: Chih-Wei Lin, Taipei (TW); Nung-Te Huang, Taipei (TW); Chih-Wan Hsu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 531 days.

(21) Appl. No.: 12/470,424

(22) Filed: May 21, 2009

(65) Prior Publication Data
US 2009/0295357 A1 Dec. 3, 2009

(30) Foreign Application Priority Data

May 30, 2008 (TW) .............................. 97120282 A

(51) Int. Cl.
*G05F 1/575* (2006.01)
*G05F 1/618* (2006.01)
(52) U.S. Cl. ........................ 323/284; 323/272
(58) Field of Classification Search .................. 323/271, 323/272, 282, 284, 350, 285
See application file for complete search history.

(56) References Cited

U.S. PATENT DOCUMENTS

| 7,007,176 | B2 * | 2/2006 | Goodfellow et al. ......... 713/300 |
| 7,068,018 | B2 | 6/2006 | Kanakubo |
| 7,109,694 | B2 * | 9/2006 | Mihalka ......................... 323/283 |
| 7,235,958 | B2 * | 6/2007 | Brassfield et al. ............ 323/282 |
| 7,327,128 | B2 * | 2/2008 | Dinh .............................. 323/272 |
| 7,570,036 | B2 * | 8/2009 | Tang et al. .................... 323/283 |
| 7,852,053 | B2 * | 12/2010 | Martin et al. ................. 323/272 |
| 7,888,921 | B2 * | 2/2011 | Tobin et al. ................... 323/282 |

FOREIGN PATENT DOCUMENTS

| CN | 2445367 Y | 8/2001 |
| CN | 17250191 A | 1/2006 |

* cited by examiner

*Primary Examiner* — Gary L Laxton
(74) *Attorney, Agent, or Firm* — Jianq Chyun IP Office

(57) ABSTRACT

A control method of a variable-frequency and multi-phase voltage regulator module is provided. The variable-frequency and multi-phase voltage regulator module is connected to a central processing unit and embedded on a motherboard for providing a central-processing-unit current. The control method includes steps of: detecting an intensity of a central-processing-unit current of the central processing unit; providing a power to the central processing unit via M number of phases based on a first switching frequency if the intensity of the central-processing-unit current is greater than a reference-current value; and providing a power to the central processing unit via N number of phases based on a second switching frequency if the intensity of the central-processing-unit current is less than the reference-current value.

11 Claims, 7 Drawing Sheets

VARIABLE-FREQUENCY AND MULTI-PHASE VOLTAGE REGULATOR MODULE AND CONTROL METHOD OF THE SAME

FIELD OF THE INVENTION

The present invention relates to a multi-phase voltage regulator module (VRM), and more particularly to a multi-phase VRM having a variable-frequency mechanism when the multi-phase VRM is determined to operate in a light load. The present invention also relates to a control method for use with a multi-phase voltage regulator module (VRM) having a variable-frequency mechanism.

BACKGROUND OF THE INVENTION

Basically, the central processing unit (CPU) of a computer system is not directly powered by a power supply. Because the amplitude of the core voltage (Vcore) required by the CPU is varied with the actual load of the CPU and the amplitude of the core voltage (Vcore) may vary sharply according to the extremely heavy load or the extremely light load on the CPU, a voltage regulator module (VRM), specifically for providing powers to CPU, is commonly introduced on a motherboard.

FIG. 1 is a block diagram depicting a conventional single-phase VRM embedded on a motherboard (not shown). The single-phase VRM comprises a pulse-width-modulation (PWM) controller 10, a driver 20, and a power stage circuit 30, where a PWM signal is outputted from the PWM controller 10 to the driver 20.

Moreover, the driver 20 comprises a steering logic circuit 22 and two driving circuits (24, 26). According to the PWM signal, a first signal and a second signal are outputted from the steering logic circuit 22 to the driving circuits 24 and 26, respectively. According to the first signal and the second signal, a first driving signal (S1) and a second driving signal (S2) are outputted from the driving circuits 24 and 26, respectively.

Moreover, the power stage circuit 30 comprises an upper power field-effect-transistor (FET) (M1), a lower power FET (M2), an output choke (L), a resistor (Rs), and an output capacitor (Co). The drain of the upper power FET (M1) is connected to a voltage-power source (Vcc); the gate of the upper power FET (M1) is for receiving the first driving signal (S1); the source of the upper power FET (M1) is connected to a first end of the output choke (L). The drain of the lower power FET (M2) is connected to the first end of the output choke (L); the gate (G) of the lower power FET (M2) is for receiving the second driving signal (S2); the source of the lower power FET (M2) is connected to ground. The resistor (Rs) is coupled between a second end of the output choke (L) and a Vcore-output end that is for outputting the core voltage (Vcore). The output capacitor (Co) is coupled between the Vcore-output end and ground. Moreover, the Vcore-output end is connected to a power layer of the motherboard (not shown), and the power layer is further connected to the CPU and for providing the core voltage (Vcore) to the CPU. The upper power FET (M1) and the lower power FET (M2) are n-MOSFETs. The voltage-power source (Vcc) is 12V.

Via the driving of the first driving signal (S1) and the second driving signal (S2) respectively on the upper power FET (M1) and the lower power FET (M2), an output current (Io), sourced from the voltage-power source (Vcc), is generated and outputted to the Vcore-output end sequentially via the output choke (L) and the resistor (Rs). Because the output current (Io) is proportional to the load of the CPU, the load of the CPU can be determined via detecting the sense voltage (Vs) which is across the resistor (Rs), so as the single-phase VRM can dynamically provide powers based on the load of the CPU. That is, if the CPU is operated at a relative-heavy load, the output current (Io) is accordingly relative large, so as the sense voltage (Vs) is relative large. The relative large sense voltage (Vs) is then outputted to a feedback logic circuit 12 arranged in the PWM controller 10. Then, a PWM signal with a relative large pulse width, for informing the driver 20 and the power stage circuit 30 to generate a relative large output current (Io), is outputted from the PWM controller 10. On the other hand, if the CPU is operated at a relative-light load, the output current (Io) is accordingly relative small, so as the sense voltage (Vs) is relative small. The relative small sense voltage (Vs) is then outputted to the feedback logic circuit 12. Then, a PWM signal with a relative small pulse width, for informing the driver 20 and the power stage circuit 30 to generate a relative small output current (Io), is outputted from the PWM controller 10.

However, even the pulse width of the PWM signal can be dynamically modulated according to the real-time load of the CPU, a frequency for outputting the PWM signal is still a constant; where the frequency for outputting the PWM signal is named switching frequency ($F_{SW}$). Please refer to FIG. 1 again. The PWM controller 10 further comprises an oscillator 11 connected to an external resistor (R1). The switching frequency ($F_{SW}$) is generated by the oscillator 11 adopted with the external resistor (R1), and basically the switching frequency ($F_{SW}$) is inverse proportional to the external resistance of the resistor (R1).

The phase in a VRM means the power stage circuit constituted by the FET, the choke, and the capacitor. In other words, a single-phase VRM means a VRM comprising one power stage circuit and a multi-phase VRM means a VRM comprising more than one power stage circuits. Because the modern CPU consumes more and more power, the multi-phase VRM, capable of providing a larger and more stable core voltage (Vcore), is commonly used on the modern motherboard.

FIG. 2 is a block diagram depicting a conventional four-phase VRM. The four-phase VRM comprises a PWM controller 40 and four current providing paths (41, 42, 43, 44). The current providing path 41 is constituted by a driver 50 and a power stage circuit 90; the current providing path 42 is constituted by a driver 60 and a power stage circuit 100; the current providing path 43 is constituted by a driver 70 and a power stage circuit 110; and the current providing path 44 is constituted by a driver 80 and a power stage circuit 120. Furthermore, four PWM signals (PWM1~PWM4) are outputted from the PWM controller 40 to the four drivers (50, 60, 70, 80), respectively.

As described above, the four phases in the VRM depicted in FIG. 2 are constituted by the four drivers (50, 60, 70, 80) respectively adopted with the four power stage circuits (90, 100, 110, 120). Because each power stage circuit (90, 100, 110, 120) comprises a Vcore-output end and each Vcore-output end can output the core voltage (Vcore), the current power required by the CPU is a sum of the four output currents (Io1, Io2, Io3, Io4) respectively outputted from the current providing paths (41, 42, 43, 44). Because the function of the four drivers (50, 60, 70, 80) is exactly same as that of the driver 20 (FIG. 1) and the function of the four power stage circuits (90, 100, 110, 120) is exactly same as that of the power stage circuit 30 (FIG. 1), no unnecessary details are given here. Furthermore, because the oscillator 45 is connected to an external resistor (R1) having a constant resistance, the switching frequency ($F_{SW}$) for outputting the four PWM signals (PWM1~PWM4) is accordingly a constant.

With the increasing number of phases in the multi-phase VRM, the reliability and the stability of the operating frequency of the CPU are accordingly secured. However, comprising more phases in a multi-phase VRM also brings more unnecessary power waste due to the impedance factor resulted in the multi-phase VRM itself. Besides, compared to a multi-phase VRM comprising a relative small number of phases, the efficiency of a multi-phase VRM comprising a relative large number of phases is relative low if the multi-phase VRM is operated at a relative-light load.

FIG. 3A is a scheme illustrating efficiency curves derived from a conventional multi-phase VRM operated at two different configurations. As depicted in FIG. 3A, the efficiency of the multi-phase VRM operated at a configuration of 8 active phases is better than operated at a configuration of 4 active phases if the CPU is operated at a heavy load (CPU current greater than I_CPUref), where the I_CPUref is an intensity of a predefined reference CPU current. However, the efficiency of the multi-phase VRM operated at a configuration of 8 active phases is poor than operated at a configuration of 4 active phases if the CPU is operated at a light load (CPU current less than I_CPUref). Therefore, via dynamically modulating the configurations of the multi-phase VRM based on the load of the CPU, an optimal efficiency of the multi-phase VRM is obtained. That is, all the phases in the multi-phase VRM are active to provide powers to the CPU if the CPU is determined to operate at a heavy load, or, only a partial phases in the multi-phase VRM are active to provide powers to the CPU if the CPU is determined to operate at a light load.

FIG. 3B is a scheme illustrating an optimum efficiency curve derived from a conventional multi-phase VRM capable of operating at different configurations (only switched between configurations of 4 active phases and 8 active phases is took as an example). As depicted in FIG. 3B, the optimum efficiency curve (bold line) of the conventional multi-phase VRM is obtained if the all the eight phases are active to provide powers when the CPU is determined to operate at a heavy load (CPU current greater than I_CPUref) but only four phases are active to provide powers when the CPU is determined to operate at a light load (CPU current less than I_CPUref).

FIG. 4 is a flowchart of a control method of the conventional multi-phase VRM capable of operating at different configurations (only a switch between two configurations of 4 active phases and 8 active phases is took as an example). First, the multi-phase VRM is initialized to a configuration of 8 active phases (step 41). According to the initial configuration at step 41, the multi-phase VRM provides powers to CPU (step 43). The multi-phase VRM determines whether the CPU current is less than the I_CPUref or not (step 45). The number of the active phases in the multi-phase VRM is maintained at eight (step 49) if the CPU current is not less than I_CPUref, and then the multi-phase VRM provides powers to CPU (step 43) based on the configuration of 8 active phases. Alternatively, the number of the active phases in the multi-phase VRM is modulated to four (step 47) if the CPU current is less than I_CPUref, and then the multi-phase VRM provides powers to CPU (step 43) based on the configuration of 4 active phases.

However, the above-mentioned multi-phase VRM still can be improved to obtain the optimum efficiency.

SUMMARY OF THE INVENTION

Therefore, the present invention relates to a multi-phase voltage regulator module (VRM) having a variable-frequency mechanism when the multi-phase VRM is determined to operate in a light load.

The present invention provides a variable-frequency and multi-phase voltage regulator module, connected to a central processing unit, comprising: a pulse-width-modulation controller for outputting a plurality of phase-width-modulation signals with different phases, and having a resistor connecting pin; a first resistor comprising a first end and a second end, wherein the first end is connected to the resistor connecting pin and the second end is connected to a relative-low voltage; a second resistor comprising a third end connected to the resistor connecting pin; a switch transistor, coupled between the relative-low voltage and a fourth end of the second resistor, is controlled by an enable signal; a plurality of current providing path for providing a central-processing-unit current to the central processing unit based on the received phase-width-modulation signals; and, a load-detect circuit with a reference-current value, for resulting in a control signal based on a comparison between an intensity of the central-processing-unit current and the reference-current value; wherein the enable signal is controlled by the control signal to generate either a first switching frequency or a second switching frequency, and either all the phase-width-modulation signals are outputted from the pulse-width-modulation controller based on the first switching frequency or a partial phase-width-modulation signals are outputted from the pulse-width-modulation controller based on the second switching frequency.

The present invention provides a host comprising a variable-frequency and multi-phase voltage regulator module, comprising: a central processing unit, and a variable-frequency multi-phase voltage regulator module for providing a central-processing-unit current to the central processing unit, further comprising: a pulse-width-modulation controller for outputting a plurality of phase-width-modulation signal with different phases and having a resistor connecting pin; a first resistor comprising a first end and a second end, wherein the first end is connected to the resistor connecting pin and the second end is connected to a relative-low voltage; a second resistor comprising a third end connected to the resistor connecting pin; a switch transistor, coupled between the relative-low voltage and a fourth end of the second resistor, is controlled by an enable signal; a plurality of current providing path for providing a central-processing-unit current to the central processing unit based on the received phase-width-modulation signals; and a load-detect circuit with a reference-current value, for resulting in a control signal based on a comparison between an intensity of the central-processing-unit current and the reference-current value; wherein the enable signal is controlled by the control signal to generate either a first switching frequency or a second switching frequency, and either all the phase-width-modulation signals are outputted from the pulse-width-modulation controller based on the first switching frequency or a partial phase-width-modulation signals are outputted from the pulse-width-modulation controller based on the second switching frequency.

The present invention provides a control method of a variable-frequency and multi-phase voltage regulator module. The variable-frequency and multi-phase voltage regulator module is connected to a central processing unit and embedded on a motherboard for providing a central-processing-unit current. The control method includes steps of: detecting an intensity of a central-processing-unit current of the central processing unit; providing a power to the central processing unit via M number of phases based on a first switching frequency if the intensity of the central-processing-unit current is greater than a reference-current value; and providing a power to the central processing unit via N number of phases based on a second switching frequency if the intensity of the central-processing-unit current is less than the reference-current value.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

According to related researches, most of the power loss wasted in the VRM is produced by the choke. The power loss produced by the choke can be computed as follows.

Power Loss of choke;

$$P_{loss,core} = 6.44 \times 10^{-13} \times F_{SW}^{1.18} \times B_{pk}^{2.27} \times V;$$

Hysteresis Loss of choke:

$$B_{pk} = (\frac{1}{2}) \times \Delta B = (L \times I_{LP} \times 10^8)/(2 \times A \times N);$$

Ripple Current of choke;

$$I_{LP} = (V_{in} - V_{core}) \times D \times (1/L) \times (1/F_{SW});$$

where $F_{SW}$ stands for switching frequency of VRM; V stands for voltage across choke; $\Delta B$ stands for flux density of choke; L stands for inductance of choke; A stands for cross-section area of choke; N stands for number of iron-corn turns of choke; D (Vcore/Vin) stands for duty cycle of VRM.

According to the above equations, the switching frequency ($F_{SW}$) is inverse proportional to the ripple current ($I_{LP}$); the ripple current ($I_{LP}$) is proportional to the hysteresis loss ($B_{pk}$); the hysteresis loss ($B_{pk}$) is proportional to the power loss of the choke ($P_{loss,core}$); therefore, the power loss of the choke ($P_{loss,core}$) can be reduced via increasing the switching frequency ($F_{SW}$).

Figure 5:
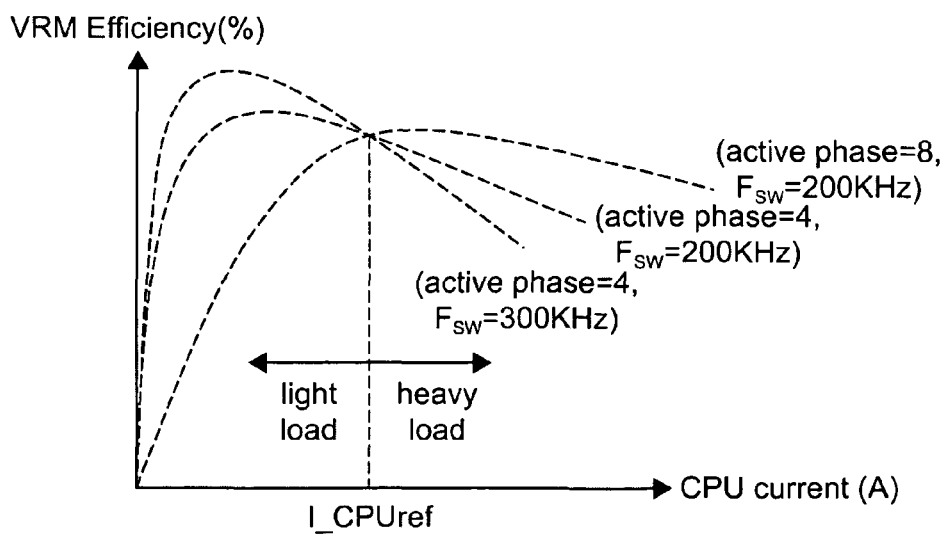
FIG. 5 is a scheme illustrating efficiency curves derived from a multi-phase VRM operated at different configurations.

However, the increasing of the switching frequency ($F_{SW}$) cannot guarantee to bring a better efficiency if the CPU is operated at a heavy load. FIG. 5 is a scheme illustrating three efficiency curves based on a VRM operated at three configurations of (4 active phases, $F_{SW}$=300 KHz), (4 active phases, $F_{SW}$=200 KHz), and (8 active phases, $F_{SW}$=200 KHz). As depicted in FIG. 5, the efficiency of the VRM operated at the configuration of (4 active phases, $F_{SW}$=300 KHz) is better than the efficiency of the VRM operated at the configuration of (4 active phases, $F_{SW}$=200 KHz) only when the CPU is restrict to operate at the light load (CPU current less than I_CPUref). Once the CPU is operated at the heavy load (CPU current greater than I_CPUref), the efficiency of the VRM operated at the configuration of (4 active phases, $F_{SW}$=300 KHz) is worse than the efficiency of the VRM operated at the configuration of (4 active phase, $F_{SW}$=200 KHz).

Therefore, developing a multi-phase VRM capable of operating at different switching frequency ($F_{SW}$) based on the load of the CPU is the main object of the present invention. That is, via introducing a variable-frequency mechanism (especially increasing the switching frequency ($F_{SW}$)) in the variable-frequency and multi-phase VRM of the present invention when the CPU is detected to operate at a light load, an improved efficiency is obtained. Besides, the better efficiency of the variable-frequency and multi-phase VRM of the present invention is still maintained when the CPU is detected to operate at a heavy load.

Figure 1:
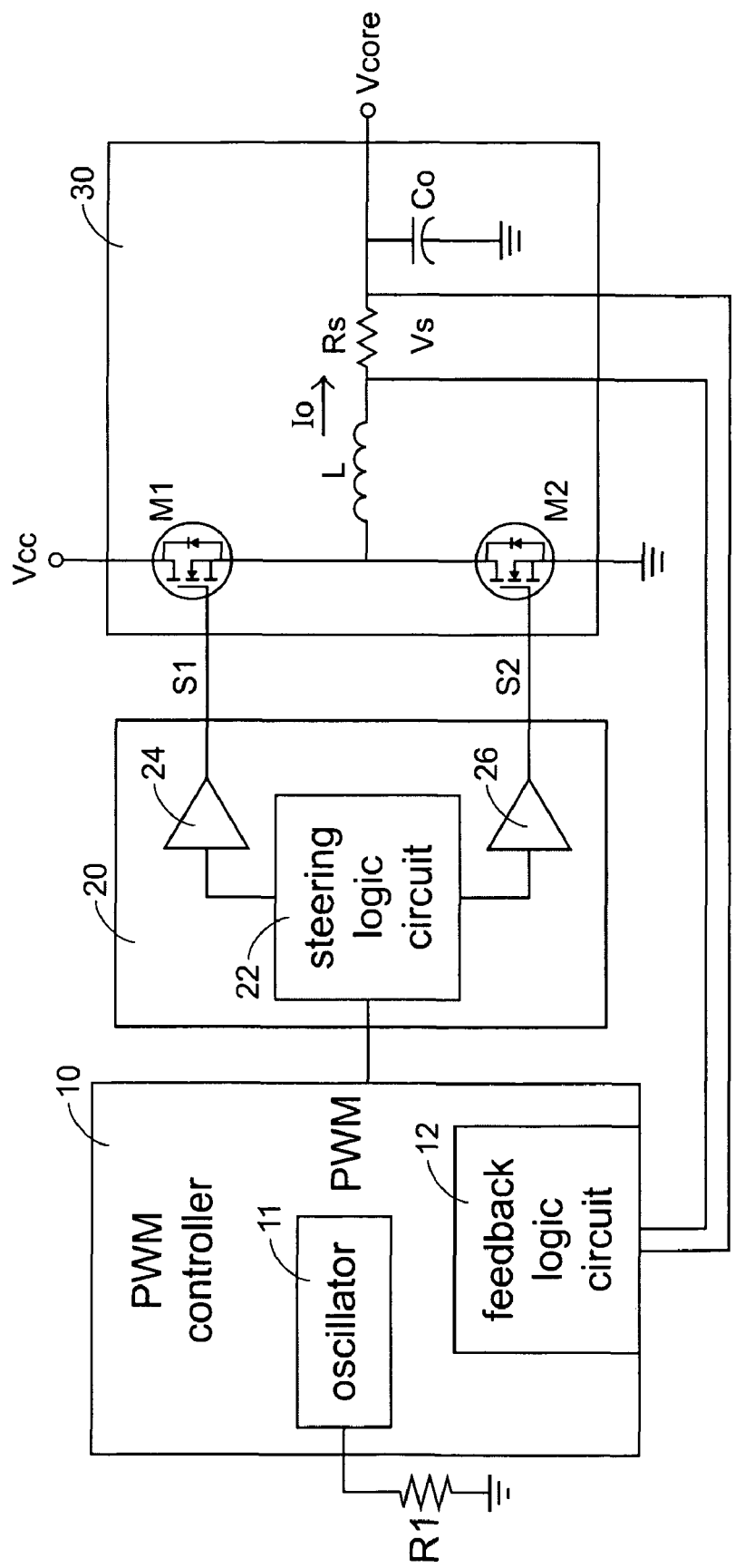
FIG. 1 is a block diagram illustrating a conventional single-phase VRM.
Figure 2:
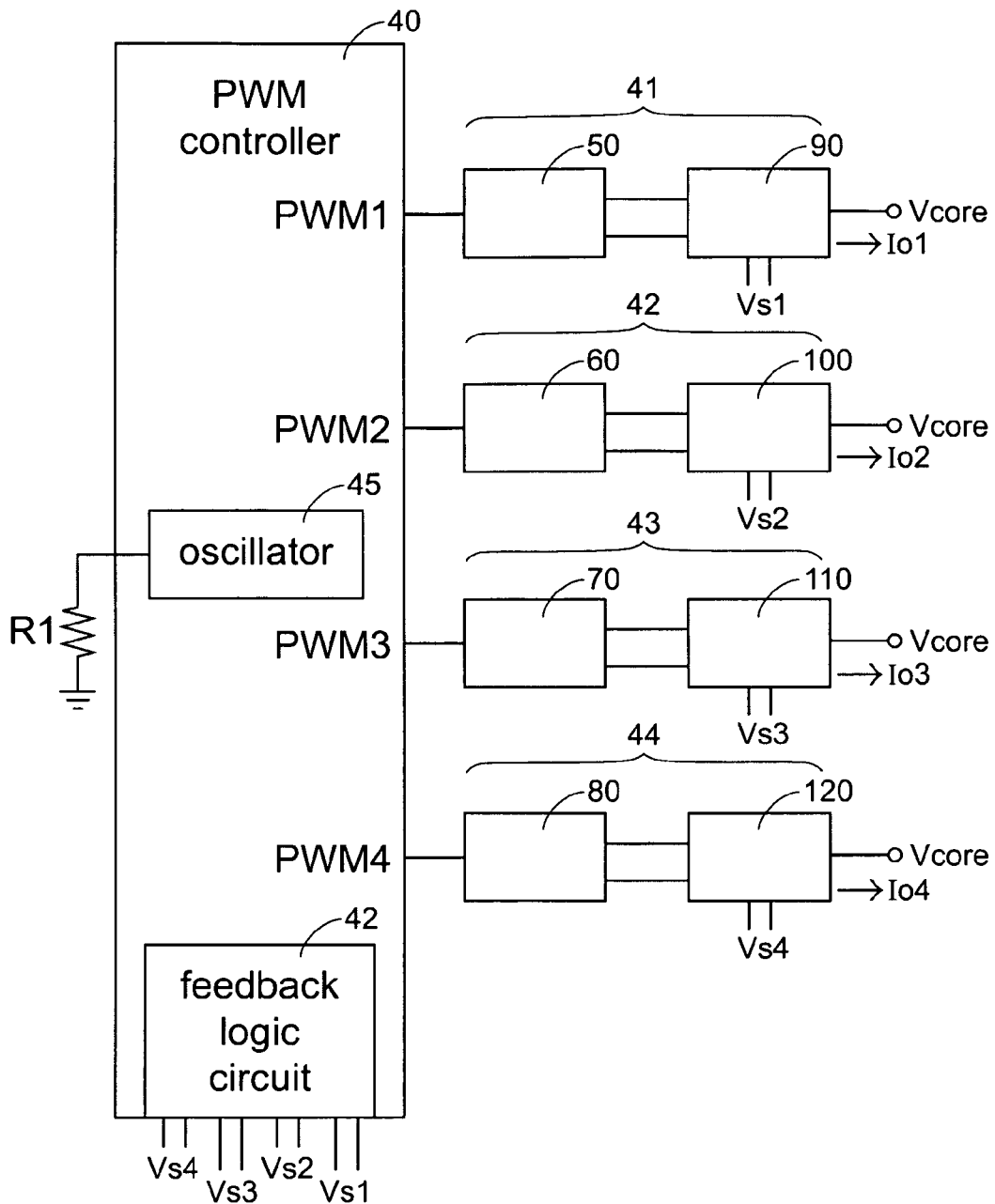
FIG. 2 is a block diagram illustrating a conventional four-phase VRM.
Figure 3A:
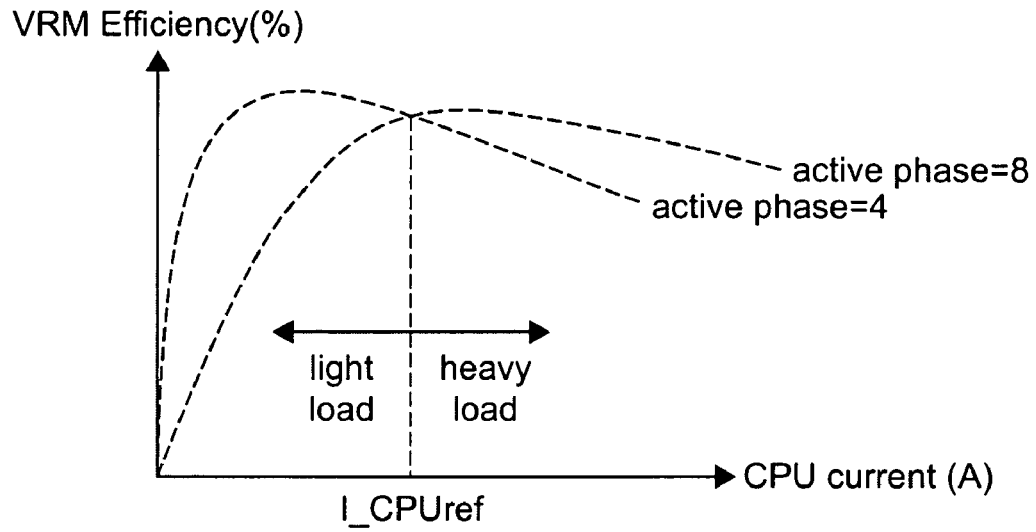
FIG. 3A is a scheme illustrating an efficiency curve derived from a conventional multi-phase VRM operated at different configurations.
Figure 3B:
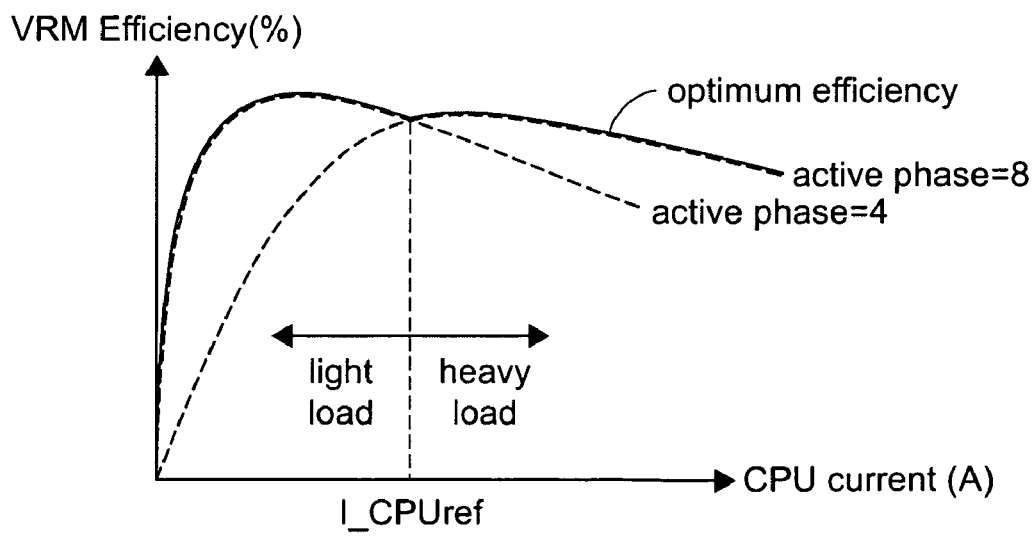
FIG. 3B is a scheme illustrating an optimum efficiency curve derived from a conventional multi-phase VRM operated at different configurations.
Figure 4:
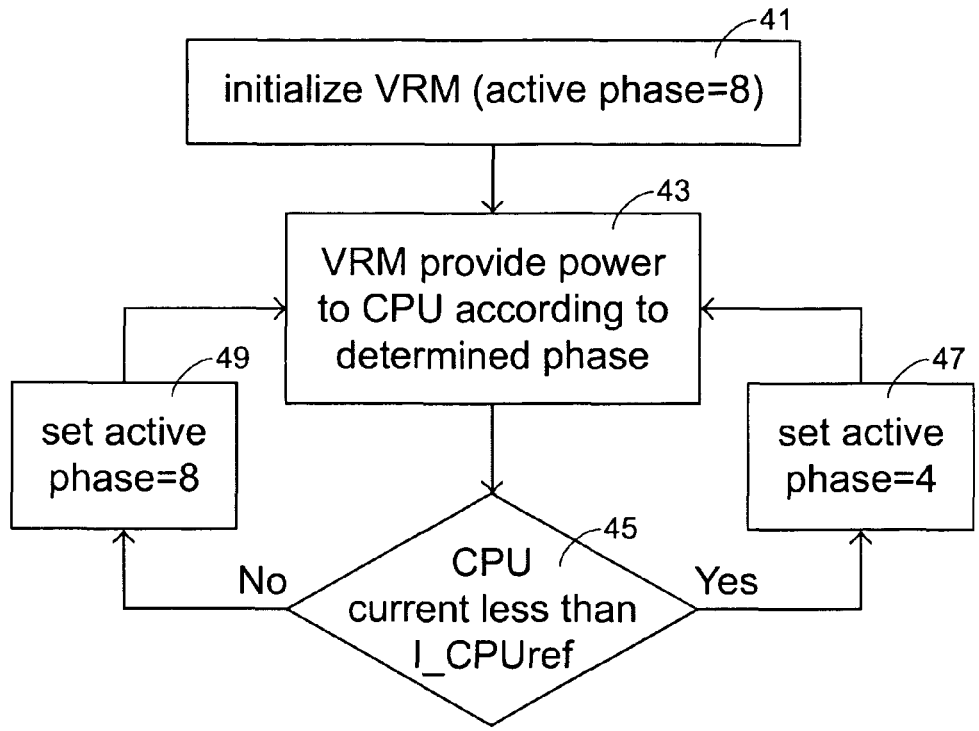
FIG. 4 is a flowchart of controlling a conventional multi-phase VRM to operate at different configurations.
Figure 6:
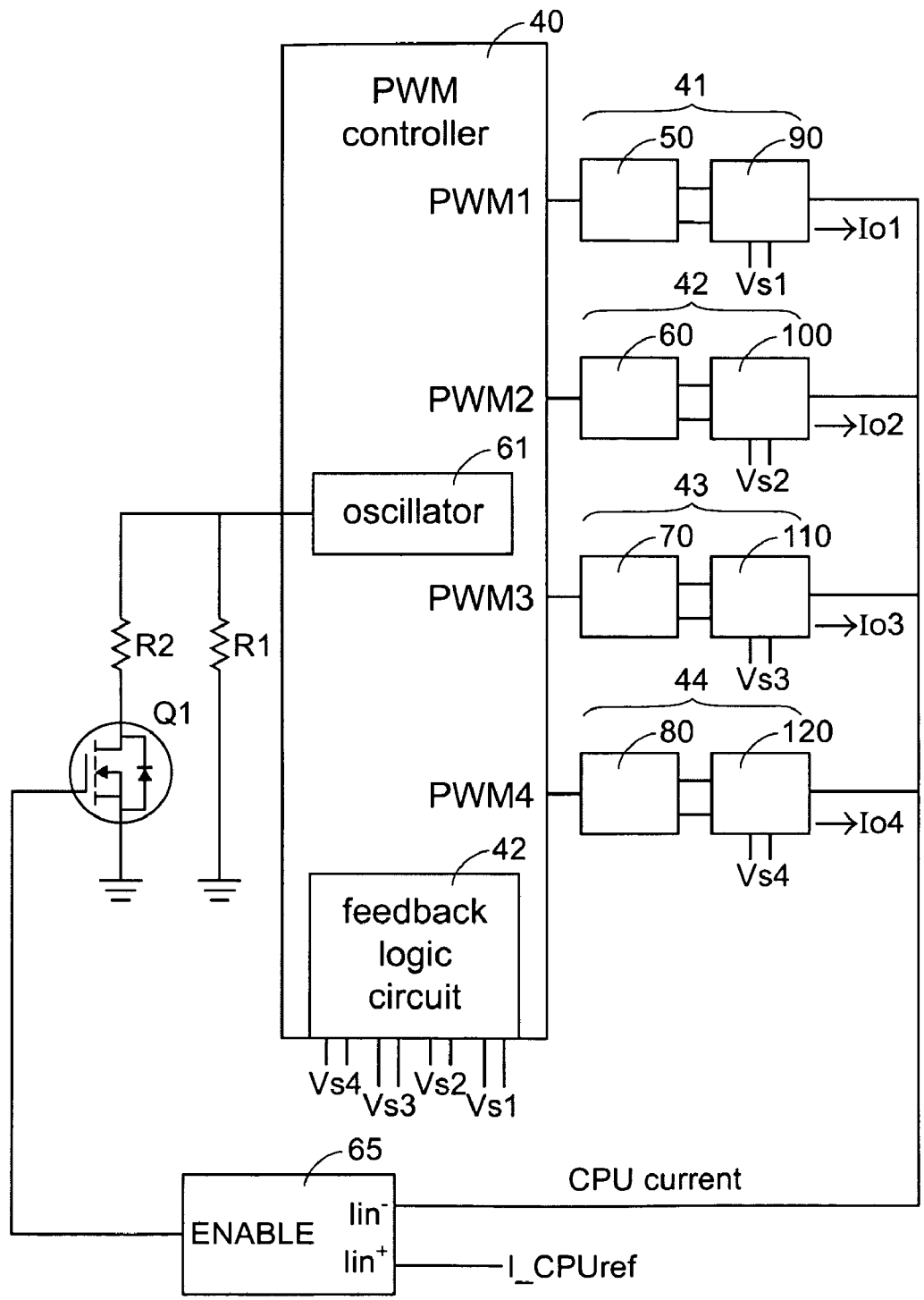
FIG. 6 is a block diagram of a variable-frequency and multi-phase VRM of the present invention.

FIG. 6 is a block diagram depicting the variable-frequency and multi-phase VRM of the present invention (only a VRM comprising 4 phases is took as an example in FIG. 6). Compared with the conventional four-phase VRM depicted in FIG. 2, the variable-frequency and multi-phase VRM of the present invention introduces a load-detect circuit 65 and has a new design of the resistors connected to the oscillator 61. Therefore, only the descriptions related to the two resistors (R1, R2), a MOS switch Q1, and the load-detect circuit 65 are given here.

As depicted in FIG. 6, the first resistor (R1) comprises a first end and a second end, where the first end is connected to the oscillator 61 and the second end is connected to ground. The second resistor (R2) comprises a first end and a second end, where the first end is connected to the oscillator 61 and the second end is connected to a MOS switch (Q1). The MOS switch (Q1) comprises a drain (D), a source (S), and a gate (G), where the drain (D) is connected the second end of the second resistor (R2); the source (S) is connected to ground; the gate (G) is for receiving an enable signal (ENABLE) which is outputted from the load-detect circuit 65. The load-detect circuit 65 comprises an negative-input end (Iin−), a positive-input end (Iin+), and an output end, where the negative-input end (Iin−) is for receiving the CPU current; the positive-input end (Iin+) is for receiving the reference CPU current (I_CPUref); the output end is for outputting the enable signal (ENABLE), moreover, the level of the enable signal (ENABLE) is determined based on the comparing result between the CPU current and the reference CPU current (I_CPUref).

First, if the CPU is determined to operate at a heavy load via the load-detect circuit 65 comparing the CPU current and the reference CPU current (I_CPUref), the switching frequency ($F_{SW}$) must be maintained at a standard frequency (e.g., 200 KHz) to obtain an optimum efficiency. To obtain the standard frequency (e.g., 200 KHz) that is generated by the oscillator 61 and the first resistor (R1), the enable signal (ENABLE), pulled down to a low level and for turning off the MOS switch (Q1), is outputted from the load-detect circuit 65 to the MOS switch (Q1). Alternatively, if the CPU is determined to operate at a light load via the load-detect circuit 65 comparing the CPU current and the reference CPU current (I_CPUref), the switching frequency ($F_{SW}$) must be raised up to a relative-high frequency (e.g., 300 KHz) to obtain an optimum efficiency. To obtain the relative-high frequency (e.g., 300 KHz) that is generated by the oscillator 61 and the two resistors (R1 and R2) in parallel, the enable signal (EN- ABLE), pulled up to a high level and for turning on the MOS switch (Q1), is outputted from the load-detect circuit 65 to the MOS switch (Q1).

To guarantee the enable signal (ENABLE) at a low level is outputted from the load-detect circuit 65 when CPU is determined to operate at a heavy load and the enable signal (ENABLE) at a high level is outputted from the load-detect circuit 65 when CPU is determined to operate at a light load, the load-detect circuit 65 is implemented by a comparator in the embodiment. That is, the two currents, CPU current and reference CPU current (I_CPUref), are first proportionally converted to two voltages, and the two voltages are then respectively outputted to the negative-input end (Iin−) and the positive-input end (Iin+) of the load-detect circuit 65 (comparator). After comparing the voltages at the negative-input end (Iin−) and the positive-input end (Iin+), the enable signal (ENABLE) at a low level for turning off the MOS switch (Q1) is outputted from the load-detect circuit 65 (comparator) if the CPU current is greater than the reference CPU current (I_CPUref), so as the standard frequency (e.g., 200 KHz) is accordingly generated by the oscillator 61 and the first resistor (R1), or, the enable signal (ENABLE) at a high level for turning on the MOS switch (Q1) is outputted from the load-detect circuit 65 (comparator) if the CPU current is less than the reference CPU current (I_CPUref), so as the relative-high frequency (e.g., 300 KHz) is accordingly generated by the oscillator 61 and the two resistors (R1 and R2) in parallel. Because generating a signal (ENABLE) at different levels according to a comparing of two currents (CPU current and reference CPU current (I_CPUref) is a well-known technique, it is understood that the invention needs not be limited to the circuit design of the load-detect circuit 65.

To sum up, if the CPU is determined to operate at a heavy load via comparing the CPU current is greater than I_CPUref), the variable-frequency and multi-phase VRM of the present invention not only activate all the phases (e.g., eight phases), but also maintains the switching frequency to a standard frequency (e.g., 200 KHz). At the configuration of (8 active phases, $F_{SW}$=200 KHz), the optimum efficiency is obtained when the CPU is operated at the heavy load. Alternatively, if the CPU is determined to operate at a light load via comparing the CPU current is less than I_CPUref), the variable-frequency and multi-phase VRM of the present invention not only activate a partial of phases (e.g., four phases), but also raises up the switching frequency to a relative-high frequency (e.g., 300 KHz). At the configuration of 4 active phases and $F_{SW}$=300 KHz, the optimum efficiency is obtained when the CPU is operated at the light load.

Figure 7:
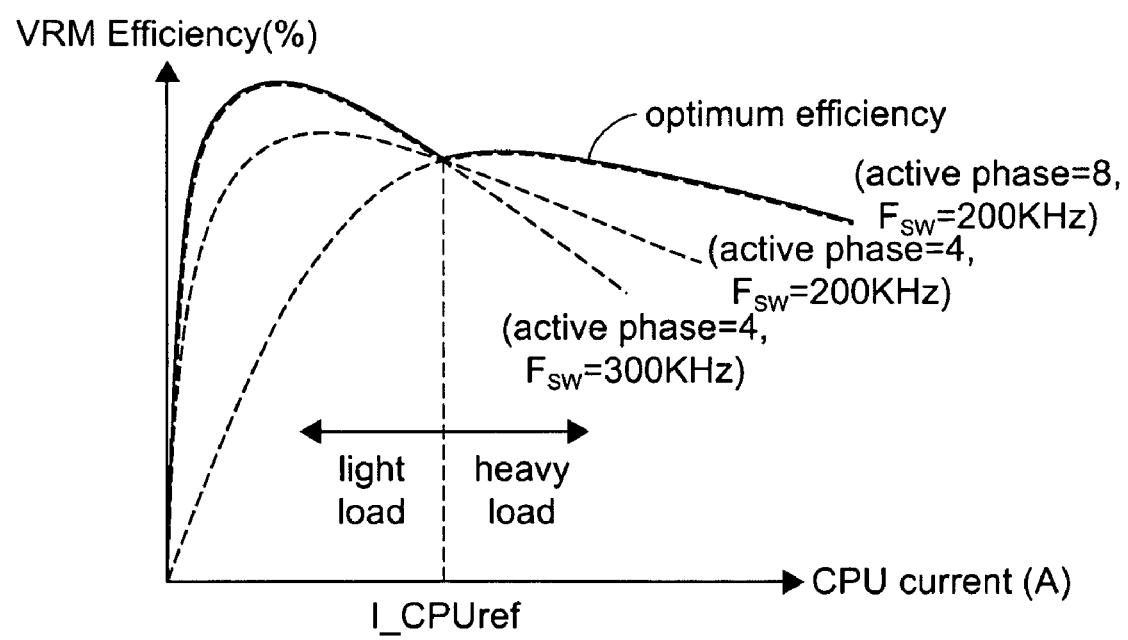
FIG. 7 is a scheme illustrating an efficiency curve derived from the variable-frequency and multi-phase VRM of the present invention operated at different configurations.

FIG. 7 is a scheme illustrating an efficiency curve derived from the variable-frequency and multi-phase VRM of the present invention (only a VRM switched between 4 phases and 8 phases is took as an example). When CPU is determined to operate at the light load (CPU current less than I_CPUref), the optimum efficiency (bold line) is obtained if the variable-frequency and multi-phase VRM of the present invention is operated at the configuration of 4 active phases and $F_{SW}$=300 KHz. Alternatively, when CPU is determined operate at the heavy load (CPU current greater than I_CPUref), the optimum performance (bold line) is obtained if the variable-frequency and multi-phase VRM of the present invention is operated at the configuration of (8 active phases, $F_{SW}$=200 KHz).

Figure 8:
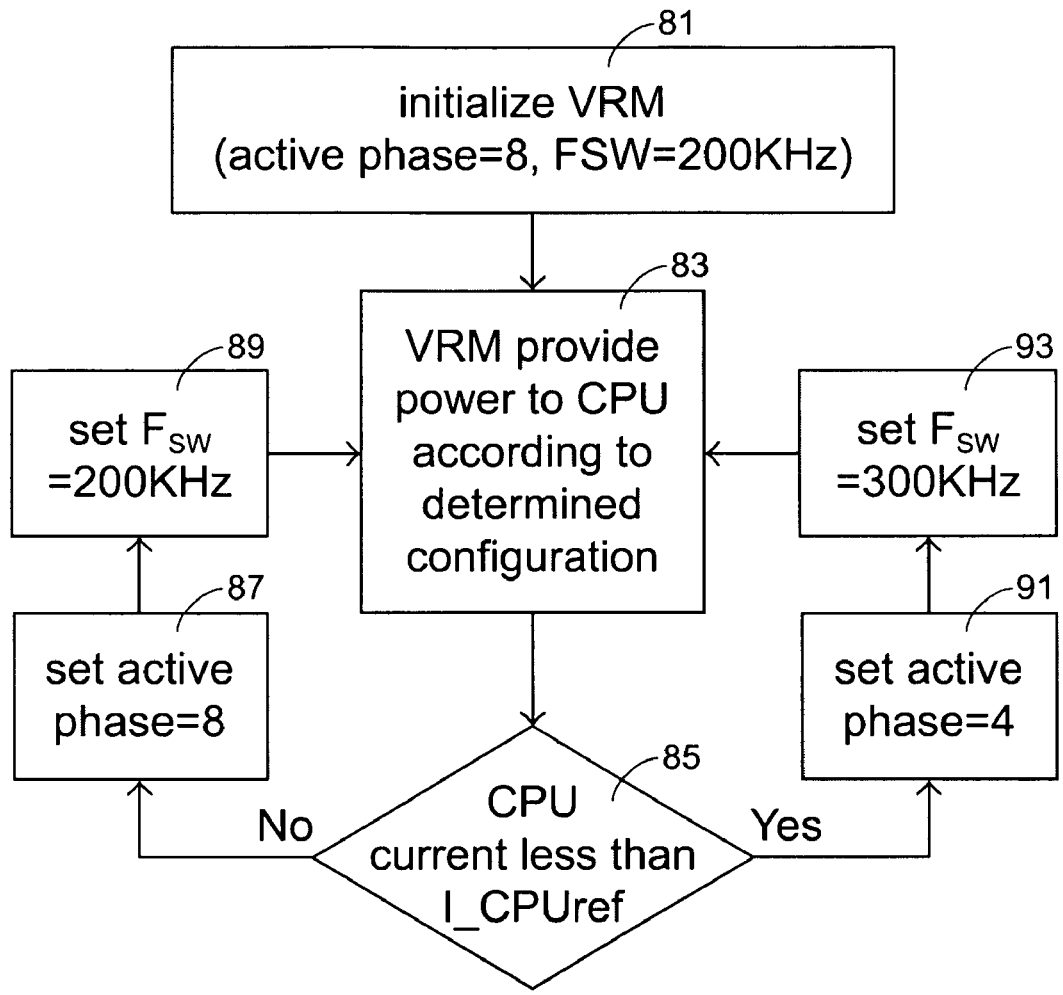
FIG. 8 is a flowchart of a control method for use with the variable-frequency and multi-phase VRM of the present invention.

FIG. 8 is a flowchart of a control method of the variable-frequency and multi-phase voltage regulator module of the present invention (only a switch between a first configurations of 4 active phases and $F_{SW}$=300 KHz and a second configuration of 8 active phases and $F_{SW}$=200 KHz is took as an example). First, the variable-frequency and multi-phase VRM is initialized to a configuration of 8 active phases and $F_{SW}$=200 KHz (step 81). According to the initial configuration at step 81, the variable-frequency and multi-phase VRM provides powers to CPU (step 83). The load-detect circuit (comparator) determines whether the CPU current is less than the I_CPUref or not (step 85). The number of the active phases in the variable-frequency and multi-phase VRM is maintained at eight (step 87) and the switching frequency ($F_{SW}$) is maintained at 200 KHz (step 89) if the CPU current is not less than I_CPUref, and then the variable-frequency and multi-phase VRM provides powers to CPU (step 83) based on the configuration of 8 active phases and $F_{SW}$=200 KHz. Alternatively, the number of the active phases in the variable-frequency and multi-phase VRM is modulated to four (step 91) and the switching frequency ($F_{SW}$) is raised up to 300 KHz (step 93) if the CPU current is less than I_CPUref, and then the variable-frequency and multi-phase VRM provides powers to CPU (step 83) based on the configuration of 4 active phases and $F_{SW}$=300 KHz.

Therefore, according to the load of CPU, both the number of the active phases and the switching frequency ($F_{SW}$) in the variable-frequency and multi-phase VRM can be modulated, so as an optimum efficiency is obtained.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A variable-frequency and multi-phase voltage regulator module, connected to a central processing unit, comprising:
   a pulse-width-modulation controller for outputting a plurality of phase-width-modulation signals with different phases, and having a resistor connecting pin;
   a first resistor comprising a first end and a second end, wherein the first end is connected to the resistor connecting pin and the second end is connected to a relative-low voltage;
   a second resistor comprising a third end connected to the resistor connecting pin;
   a switch transistor, coupled between the relative-low voltage and a fourth end of the second resistor, is controlled by an enable signal;
   a plurality of current providing paths for providing a central-processing-unit current to the central processing unit based on the received phase-width-modulation signals; and
   a load-detect circuit with a reference-current value, for resulting in a control signal based on a comparison between an intensity of the central-processing-unit current and the reference-current value;
   wherein the enable signal is controlled by the control signal to generate either a first switching frequency or a second switching frequency, and either all the phase-width-modulation signals are outputted from the pulse-width-modulation controller based on the first switching frequency or a partial of the phase-width-modulation signals are outputted from the pulse-width-modulation controller based on the second switching frequency;
   wherein the variable-frequency and multi-phase voltage regulator module detects an intensity of a central-processing-unit current of the central processing unit and provides a power to the central processing unit via M number of phases based on a first switching frequency if the intensity of the central-processing-unit current is greater than a reference-current value, and the variable-frequency and multi-phase voltage regulator module provides a power to the central processing unit via N number of phases based on a second switching frequency if the intensity of the central-processing-unit current is less than the reference-current value.

2. The variable-frequency and multi-phase voltage regulator module according to claim 1 wherein the first switching frequency, generated by the first resistor via turning off the switch transistor by the enable signal while the intensity of the central-processing-unit current is greater than the reference-current value, is outputted to the resistor connecting pin of the pulse-width-modulation controller, and all the phase-width-modulation signals are outputted from the pulse-width-modulation controller based on the first switching frequency, or the second switching frequency, generated by the first resistor and the second resistor via turning on the switch transistor by the enable signal while the intensity of the central-processing-unit current is less than the reference-current value, is outputted to the resistor connecting pin of the pulse-width-modulation controller, and a partial of the phase-width-modulation signals are outputted from the pulse-width-modulation controller based on the second switching frequency.

3. The variable-frequency and multi-phase voltage regulator module according to claim 2 wherein the quantity of all the pulse-width-modulation signals is eight and the quantity of the partial of the pulse-width-modulation signals is four.

4. The variable-frequency and multi-phase voltage regulator module according to claim 1 wherein the load-detect circuit is a comparator, and the enable signal, outputted from the load-detect circuit, is at a first level if the intensity of the central-processing-unit current is less than the reference-current value; or the enable signal is at a second level if the intensity of the central-processing-unit current is greater than the reference-current value.

5. The variable-frequency and multi-phase voltage regulator module according to claim 1 wherein each current providing path further comprises:
  a drive, connected to the pulse-width-modulation controller, for receiving a corresponding pulse-width-modulation signal out of the plurality pulse-width-modulation signal; and
  a power stage circuit, connected to the driver, for resulting in the central-processing-unit current and outputting to the central processing unit.

6. The variable-frequency and multi-phase voltage regulator module according to claim 1, wherein M is greater than N and the second switching frequency is greater than the first switching frequency.

7. The variable-frequency and multi-phase voltage regulator module according to claim 1, wherein M is eight and N is four.

8. A host comprising a variable-frequency and multi-phase voltage regulator module, comprising:
  a central processing unit, and
  a variable-frequency multi-phase voltage regulator module for providing a central-processing-unit current to the central processing unit, further comprising:
  a pulse-width-modulation controller for outputting a plurality of phase-width-modulation signal with different phases and having a resistor connecting pin;
  a first resistor comprising a first end and a second end, wherein the first end is connected to the resistor connecting pin and the second end is connected to a relative-low voltage;
  a second resistor comprising a third end connected to the resistor connecting pin;
  a switch transistor, coupled between the relative-low voltage and a fourth end of the second resistor, is controlled by an enable signal;
  a plurality of current providing paths for providing a central-processing-unit current to the central processing unit based on the received phase-width-modulation signals; and
  a load-detect circuit with a reference-current value, for resulting in a control signal based on a comparison between an intensity of the central-processing-unit current and the reference-current value;
  wherein the enable signal is controlled by the control signal to generate either a first switching frequency or a second switching frequency, and either all the phase-width-modulation signals are outputted from the pulse-width-modulation controller based on the first switching frequency or a partial phase-width-modulation of the signals are outputted from the pulse-width-modulation controller based on the second switching frequency;
  wherein the variable-frequency and multi-phase voltage regulator module detects an intensity of a central-processing-unit current of the central processing unit and provides a power to the central processing unit via M number of phases based on a first switching frequency if the intensity of the central-processing-unit current is greater than a reference-current value, and the variable-frequency and multi-phase voltage regulator module provides a power to the central processing unit via N number of phases based on a second switching frequency if the intensity of the central-processing-unit current is less than the reference-current value.

9. The host comprising a variable-frequency and multi-phase voltage regulator module according to claim 8 wherein the first switching frequency, generated by the first resistor via turning off the switch transistor by the enable signal while the intensity of the central-processing-unit current is greater than the reference-current value, is outputted to the resistor connecting pin of the pulse-width-modulation controller, and all the phase-width-modulation signals are outputted from the pulse-width-modulation controller based on the first switching frequency, or the second switching frequency, generated by the first resistor and the second resistor via turning on the switch transistor by the enable signal while the intensity of the central-processing-unit current is less than the reference-current value, is outputted to the resistor connecting pin of the pulse-width-modulation controller, and a partial phase-width-modulation signals are outputted from the pulse-width-modulation controller based on the second switching frequency.

10. The host comprising a variable-frequency and multi-phase voltage regulator module according to claim 8 wherein the load-detect circuit is a comparator, and the enable signal, outputted from the load-detect circuit, is at a first level if the intensity of the central-processing-unit current is less than the reference-current value; or the enable signal is at a second level if the intensity of the central-processing-unit current is greater than the reference-current value.

11. The host comprising a variable-frequency and multi-phase voltage regulator module according to claim 8 wherein each current providing path further comprises:
   a drive, connected to the pulse-width-modulation controller, for receiving a corresponding pulse-width-modulation signal out of the plurality pulse-width-modulation signal; and
   a power stage circuit, connected to the driver, for resulting in the central-processing-unit current and outputting to the central processing unit.

* * * * *